United States Patent
Seidel et al.

(10) Patent No.: US 6,316,584 B1
(45) Date of Patent: Nov. 13, 2001

(54) METHOD FOR PRODUCING POLYESTERS AND COPOLYESTERS

(75) Inventors: Ulf Seidel, Remscheid; Michael Gerd Martl, Frankfurt, both of (DE)

(73) Assignee: Akzo Nobel NV, Arnhem (NL)

( * ) Notice: Subject to any disclaimer, the term of this patent is extended or adjusted under 35 U.S.C. 154(b) by 0 days.

(21) Appl. No.: 09/445,566

(22) PCT Filed: Jun. 6, 1998

(86) PCT No.: PCT/EP98/03400

§ 371 Date: Dec. 9, 1999

§ 102(e) Date: Dec. 9, 1999

(87) PCT Pub. No.: WO98/56848

PCT Pub. Date: Dec. 17, 1998

(30) Foreign Application Priority Data

Jun. 10, 1997 (DE) .............................................. 197 24 349

(51) Int. Cl.$^7$ .................................................... C08G 63/78
(52) U.S. Cl. ........................ 528/279; 528/275; 528/277; 528/280; 528/281; 528/282; 528/283; 528/286; 524/706; 524/710; 524/783; 524/784; 524/786
(58) Field of Search ...................... 528/275, 277, 528/279, 280, 281, 282, 283, 286; 524/706, 710, 783, 784, 786

(56) References Cited

U.S. PATENT DOCUMENTS

| | | |
|---|---|---|
| 3,023,192 | 2/1962 | Shivers, Jr. et al. . |
| 3,936,421 | 2/1976 | Hayashi et al. . |
| 4,072,631 | 2/1978 | Vogt et al. . |
| 4,421,908 | 12/1983 | East . |
| 5,106,944 | 4/1992 | Sublett . |
| 5,656,716 | * 8/1997 | Schmidt et al. .................. 528/279 |
| 5,684,116 | * 11/1997 | Martl et al. ..................... 528/176 |
| 5,789,528 | * 8/1998 | Martl et al. ..................... 528/279 |

FOREIGN PATENT DOCUMENTS

| | | |
|---|---|---|
| 619210 | 11/1961 | (BE) . |
| 947517 | 8/1956 | (DE) . |
| 2352584 | 5/1974 | (DE) . |
| 4400300 A1 | 7/1995 | (DE) . |
| 4443648 A1 | 6/1996 | (DE) . |
| 0 051 220 | 12/1982 | (EP) . |
| 0 109 123 | 5/1984 | (EP) . |
| 0 472 366 A2 | 2/1992 | (EP) . |
| 0 496 404 A1 | 7/1992 | (EP) . |
| 0736560 A2 | 10/1996 | (EP) . |
| 682866 | 11/1952 | (GB) . |
| 52-86496 | 7/1977 | (JP) . |
| 53-106792 | 9/1978 | (JP) . |
| 53-109597 | 9/1978 | (JP) . |
| 55-23136 | 2/1980 | (JP) . |

OTHER PUBLICATIONS

Yoldas, "Formation of Titania–Silica Glasses by Low Temperature Chemical Polymerization", Journal of Non–Crystalline Solids 38 & 39 (1980), pp. 81–86.

Barringer et al., "Formation, Packing, and Sintering of Monodisperse $TiO_2$ Powders", Communications of the American Ceramic Society, Dec. 1982, pp. C–199–C–201.

Fegley, Jr. et al., "Synthesis and Characterization of Monosized Doped $TiO_2$ Powders", Communications of the American Ceramic Society, Jun. 1984, pp. C–113–C–116.

Derwent Abstract, JA–PS 7411474.

STN International, File CAPLUS, Accesion No. 1975:4793, Asahi Chemical Industry Co., Ltd.: "Linear Polyesters", Japan., 7 pp., Chemical Abstracts No. 82:4793.

* cited by examiner

Primary Examiner—Samuel A. Acquah
(74) Attorney, Agent, or Firm—Oliff & Berridge, PLC

(57) ABSTRACT

For the production of polyesters and copolyesters, coprecipitates are used individually or in a mixture as polycondensation catalysts, the coprecipitates being prepared by simultaneous hydrolytic precipitation of a titanium compound and a metallic compound of a metal selected from the groups IA, IIA, VIIIA, IB, IIB, IIIB, and IVB, whereby the titanium compound and the metallic compound are, independently of one another, an alkylate, alcoholate, or carboxylate of titanium or the metal, respectively, and the molar ratio of the titanium compound to the metallic compound is $\geq 50{:}50$ mol/mol. The coprecipitates exhibit a higher catalytic activity than $Sb_2O_3$ which results in a prefered amount of usage of only 10 to 100 ppm with respect to the esters or oligoesters to undergo polycondensation.

19 Claims, No Drawings

US 6,316,584 B1

METHOD FOR PRODUCING POLYESTERS AND COPOLYESTERS

BACKGROUND OF THE INVENTION

Independent of their constitution, which can cover a number of possible variations from aliphatic to fully aromatic, polyesters and copolyesters are generally produced in a two-stage process. In the first stage, the esters to undergo polycondensation, or a polyester precondensate comprising a mixture of oligoesters and having an average relative molecular weight of normally 100–2,000 depending on the molar ratio of the starting compounds, are produced by transesterification of dicarboxylic acid esters or esterification of dicarboxylic acids with an excess of dialcohols. If a branching modification is desired, limited amounts of higher-functional starting components such as glycerin, pentaerythritol, or trimellitic acid can also be employed. Equivalent process methods for the first stage are the conversion of dicarboxylic acid chlorides with diols, the attachment of ethylene oxide to dicarboxylic acids, the esterification of an anhydride with a dialcohol, the conversion of anhydrides with epoxides, and the conversion of dicarboxylic acids or dicarboxylic acid esters with the diacetate of a diol. The second reaction stage is the actual polycondensation, in which the desired high molecular weight of the polyesters and copolyesters must be attained through splitting off alcohol and/or water. In addition to applying a vacuum, introducing an inert gas, and increasing the reaction temperature, polycondensation is accelerated in particular by specific polycondensation catalysts.

For the production of film and fiber-forming polyesters, a legion of polycondensation catalysts have been proposed to accelerate the polycondensation reaction. Since the great majority of the compounds cited in numerous patents have an insufficient catalytic activity or other disadvantages, compounds containing Sb have found almost exclusive use as polycondensation catalysts in the art. Unfortunately, this catalyst has recently encountered criticism on environmental grounds, so that a replacement generally appears to be desirable.

Attempts are constantly being made to supply catalysts to replace $Sb_2O_3$. In particular, alkoxy titanates, especially tetrabutyl titanate, have been proposed, whereby these compounds are used either for transesterification only (JA-PS 74 11 474), transesterification and polycondensation (JA-OS 77 86 496), or polycondensation only (JA-OS 80 23 136), since they are catalytically active in both stages. Since the use of titanium compounds causes discoloration of the polycondensed polyesters, JA-OS 78 106 792 requires pretreatment of titanium compounds with various organic substances, e.g., amines, or they must be combined with other polycondensation catalysts, in particular with $Sb_2O_3$ (JA-OS 78 109 597).

DE P 947 517 teaches that metallic oxides such as zinc oxide, boron trioxide, lead oxide, and titanium dioxide can be used as polycondensation catalysts for producing polyethylene terephthalate. The polycondensation time with these metallic oxides, however, is inordinately long, from 7–14 hours in the examples given in that publication. For this reason, BE P 619 210 uses $Sb_2O_3$ (see example 1) as a polycondensation catalyst to supplement $TiO_2$ for producing the polyesters described therein, which dramatically increases the speed of the polycondensation process. Given these circumstances, it of course became practical to work only with $Sb_2O_3$ or titanium tetrabutylate as a polycondensation catalyst (see the additional examples of BE P 619 210).

DE-A1 44 00 300 and DE-A1 44 43 648 disclose $TiO_2$/$SiO_2$ and $TiO_2ZrO_2$ coprecipitates as polycondensation catalysts.

SUMMARY OF THE INVENTION

The present invention responds to the task of providing additional novel polycondensation catalysts for the general synthesis of polyesters and copolyesters as replacements for $Sb_2O_3$, whereby the catalysts are distinguished in particular by a higher catalytic activity than that demonstrated by $Sb_2O_3$, $TiO_2$, or titanium tetrabutylate in the same respective concentration.

The subject of the invention is a process for producing polyesters and copolyesters via polycondensation of polyester-forming starting components, whereby in a first reaction stage esters or oligoesters are produced that in a second reaction stage are polycondensed in the presence of titanium catalysts, the process being characterized by using coprecipitates, individually or in a mixture, as polycondensation catalysts in the polycondensation stage for polycondensing the esters or oligoesters, the coprecipitates being prepared by simultaneous hydrolytic precipitation of a titanium compound and a compound of a metal selected from the groups IA, IIA, VIIIA, IB, IIB, IIIB, or IVB, whereby the titanium and metallic compounds are, independently of one another, an alkylate, alcoholate, or carboxylate of titanium or the metal, respectively, and the molar ratio of the titanium compound to the metallic compound is $\geq 50:50$ mol/mol.

DETAILED DESCRIPTION OF PREFERRED EMBODIMENTS

Metals preferred as metallic compounds are sodium, potassium, magnesium, calcium, iron, cobalt, copper, zinc, aluminum, germanium, and tin.

The preferred molar ratio of the titanium compound to the metallic compound is $\geq 80:20$ mol/mol.

The alkylate, alcoholate, or carboxylate group of titanium or the metal, respectively, is for example a compound with 1 to 6 C atoms, whereby the butyl group is especially preferred as the alkylate; the methylate, ethylate, or i-propylate group as the alcoholate; and the acetate or oxalate group as the carboxylate.

A particular high catalytic activity is exhibited by coprecipitates of the invention derived from titanium(IV) tetraisopropylate and tin(IV) dioxalate in a molar ratio of 90:10 mol/mol.

In general, the coprecipitates of the invention have a water content of 0 to 15% by weight, determined by Karl Fischer titration and referred to the hydrated coprecipitate. In the case of water content exceeding 15% by weight, the shelf life decreases, because these catalysts exhibit considerably reduced activity after storage.

Due to the fact that $TiO_2$ represents a poor polycondensation catalyst for the synthesis of polyesters (see comparative examples 3a and 3b), it is surprising that the coprecipitates of the invention are at all highly effective polycondensation catalysts, in particular for the production of filament-forming high-molecular polyesters and copolyesters, and moreover in the very small quantities that are preferred.

The production of the coprecipitates of the invention from alcoholates is in principle already known (see for example B. E. Yoldes, J. Non-Cryst. Solids, 38 and 39, 81 (1980); E. A. Barringer, H. K. Bowen, J.Am.Ceram. Soc., 65 C 199 (1982); E. A. Barringer, Ph.D. Thesis, MIT (1982); B.

Fegley jr., E. A. Barringer, H. K. Bowen, J.Am.Ceram. Soc., 67 C 113 (1984)). The starting metallic alkoxides have the formula $M(OR)_m$, where M is Ti and a metal selected from the groups IA, IIA, VIIIA, IB, IIB, IIIB, and IVB, depending on the desired coprecipitate, and m is the most stable oxidation state of the metal. The alkoxides are subjected to hydrolysis, whereby a network is formed as a result of polymerization reactions.

Alcohols suited for preparing metal alkoxides according to methods known per se are, for example, monohydric alcohols such as methyl alcohol, ethyl alcohol, propyl alcohol, isopropyl alcohol, n-butanol, isobutyl alcohol, n-amyl alcohol, 3-methyl-1-butanol, n-hexanol, 2-hexanol, 2-heptanol, n-octanol, and n-decanol, which can be used individually or as mixtures. However, polyhydric alcohols, possibly as a mixture with monohydric alcohols, can also be used, such as ethylene glycol, 1,2-propane diol, 1,4-butane diol, 1,6-hexane diol, 1,10-decane diol, glycerin, trimethylol propane, and pentaerythritol.

In an analogous manner, the coprecipitates can be produced from alkylates such as butylates or from carboxylates such as acetates or oxalates.

The hydrolysis of the organometallic compounds, such as of titanium tetraisopropylate and Sn(IV) dioxalate, can be performed in a number of ways. For example, the titanium and metallic compounds dissolved in pure alcohols, such as ethanol, can be hydrolyzed by adding water or an aqueous alcohol within about 20 minutes to 2 hours at 0 to 50° C. The hydrolysis can, however, also be performed by adding water or an aqueous alcohol solution dropwise to the undissolved mixture of the titanium and metallic compounds under the aforementioned conditions. The water required for hydrolysis can also be present as moisture in a gas phase, e.g., by feeding in moist nitrogen to the titanium and metallic compound mixture for 3 to 30 hours at 0 to 50° C. The quasi "in situ formation" of a dispersion, suitable for use in the reactor, of the coprecipitate in glycol can also be advantageous. In this case, the undissolved mixtures of the titanium and metallic compounds can be precipitated as a coprecipitate, under the aforementioned conditions, by addition of glycol containing the quantity of water required for hydrolysis. If the glycol contains lesser water amounts, the hydrolysis can additionally be performed by feeding moist nitrogen into the reaction vessel, for example.

Advantageous forms of producing the coprecipitates used in accordance with the invention at room temperature are described in the experimental part in examples 1 to 13. The hydrolytic conditions described in the examples rule out gel formation, which must be avoided, and result in a homogeneous precipitation of the respective coprecipitates.

The added amounts of the precipitates and coprecipitates of the invention, used as polycondensation catalysts, can be varied within wide ranges and encompass an overall amount of about 5 to 500 ppm with respect to the esters or oligoesters to undergo polycondensation. However, these amounts can in principle extend up to the same order of magnitude as when $Sb_2O_3$ is used, which as a rule is employed in amounts of 300 to 600 ppm as a polycondensation catalyst.

If, however, attention must be paid in certain applications for the produced polyesters and copolyesters to attaining good color values, it is preferred to use the coprecipitate in a total amount of only 10 to 100 ppm, with respect to the esters or oligoesters to undergo polycondensation. The increased catalytic activity of the coprecipitates used in accordance with the invention allows the use of added amounts that are considerably less than when $Sb_2O_3$ is used, whereby the same polycondensation time and—at least when using a coprecipitate derived from titanium(IV) tetraisopropylate and tin(IV) dioxalate—a fully acceptable b* value of 3.0 to 8.0 is attained in this case with the polyesters so produced. This b* value range corresponds in particular to the values that are also obtained in the production of polyethylene terephthalate when using 400 ppm $Sb_2O_3$ as a polycondensation catalyst.

Addition of the coprecipitates of the invention is preferably performed in the form of a 5 to 20% glycolic suspension to the esters or oligoesters synthesized in the first reaction stage, for example the bisglycol ester of the dicarboxylic acid(s) to undergo polycondensation and/or the precondensate from one or more such bisglycol esters, prior to their polycondensation. It is also possible in principle, however, to add the coprecipitates as early as some time during the first reaction stage, in the case of transesterification possibly together with one or more transesterification catalysts. In the case of transesterification in the first reaction stage, it can at times be advantageous to block the transesterification catalyst after transesterification, in a manner known per se, by adding phosphorus compounds. Suitable phosphorus compounds are, for example, carbethoxymethyl-diethyl phosphonate, di(polyoxyethylene)hydroxymethyl phosphonate, tetraisopropylmethylene diphosphonate, and $H_3PO_4$, where in general an added P concentration of 30–50 ppm is sufficient.

Under conventional reaction conditions, the coprecipitates of the invention are suited in principle as polycondensation catalysts for producing a wide variety of polyesters and copolyesters where $Sb_2O_3$ has been used as a polycondensation catalyst up to now, possibly also in combination with one or more other polycondensation catalysts. The variety of polyester and copolyester types also corresponds to a wide variety of applications.

To the extent that alkyd resins and saturated polyester resins (hydroxypolyesters) with a relative molecular weight of <10,000 are produced with the coprecipitates of the invention, these can be used as binders in paints and coating materials. Alkyd resins in the current terminology are understood to be oil- or fatty-acid modified polyesters derived from polycarboxylic acids and polyalcohols and their conversion products with vinyl compounds, epoxy resins, silicones, diisocyanates, and organometallic compounds ("modified" alkyd resins), for example. The principal polycarboxylic acids used for alkyd resins are phthalic acid, isophthalic acid, malonic acid, succinic acid, adipic acid, azelaic acid, sebacic acid, dodecanic diacid, dimerized fatty acids, hexahydrophthalic acid, hexahydroterephthalic acid, maleic acid, fumaric acid, and, for flame retardancy, halogen-containing dicarboxylic acids such as tetrachlorophthalic acid anhydride. As polyols, glycerin, pentaerythritol, dipentaerythritol, trimethylol propane, trimethylol ethane, sorbitol, and difunctional polyols such as ethylene glycol, 1,2-propylene glycol, 1,3- and 1,4-butane diol, diethylene glycol, dipropylene glycol, and neopentyl glycol are used in general. The third component for producing alkyd resins are long chain fatty acids, whether synthetic fatty acids such as pelargonic acid, abietic acid, or synthetic fatty acid mixtures ($C_7$–$C_9$), or natural fatty acids, which are used almost exclusively in the form of their fats and oils, such as linseed oil, castor oil, coconut oil, soybean oil, and cottonseed oil. To prepare the saturated polyester resins defined in DIN 55 945, in contrast, no relatively long-chain fatty acids are used in polycondensation, while otherwise the saturated polycarboxylic acids and polyalcohols used are chiefly the same ones used in producing alkyd resins.

If (co)polyesters are synthesized with the coprecipitates of the invention as precursors for polyurethanes with a relative molecular weight of <10,000, this leads, depending on further processing using known methods, not only to polyurethane paints but also to a variety of plastics of varying valuable usability features (duromers, thermoplasts, cast elastomers, hard and soft expanded plastics, pressing compounds, hard and flexible coatings, adhesives). The low-molecular polyesters and copolyesters as precursors for polyurethanes are generally produced from saturated aliphatic or aromatic dicarboxylic acids and difunctional or di- and trifunctional alcohols and are linear or slightly to extensively branched. With the coprecipitates used in accordance with the invention, the production of the known total broad palette of hydroxypolyesters with hydroxyl numbers of 28–300 mg KOH/g and acid numbers usually under 1 mg KOH/g is possible. The extensively branched polyesters among them, which for the most part are obtained on the basis of aromatic or hydroaromatic dicarboxylic acids, serve primarily as binders for polyurethane paints.

Under conventional reaction conditions, the coprecipitates used in accordance with the invention are particularly suited as polycondensation catalysts for producing the known high-melting-point fiber and film-forming polyesters such as polyethylene terephthalate, polybutylene terephthalate, poly(ethylene-2,6-naphthalene dicarboxylate), poly(butylene-2,6-naphthalene dicarboxylate), poly(1,4-dimethylenecyclohexane terephthalate), and their polyester blends on the basis of high homopolyester fractions of at least 80 mole percent, which belong to the category of thermoplastic polyesters. Such polyesters and copolyesters have in principle a molecular weight of >10,000. The polyalkylene terephthalates preferably polycondensed with the coprecipitates, in particular polyethylene terephthalate and polybutylene terephthalate, can, as polyester blends, consist up to 20 mole percent of units derived from at least one additional polyester-forming component. Otherwise, it is by nature unimportant, when using the polycondensation catalysts of the invention, whether the bisglycol esters of the dicarboxylic acid(s) to be polycondensed and/or the precondensates from one or more such bisglycol esters are produced using a transesterification or a direct esterification process.

The polycondensation catalysts of the invention are thus suited for producing both a fiber-forming polyethylene terephthalate with an intrinsic viscosity [η] of 0.65–0.75, which normally is further processed into staple fibers for textile purposes, and fiber-forming polyethylene terephthalates with an intrinsic viscosity [η] of 0.75–0.80 and 0.95–1.05, from which filament yarns are produced for industrial purposes. The increased molecular weights can be attained by continuous polycondensation with direct spinning or preferably by postcondensation in the solid phase. For postcondensation in the solid phase, it is advantageous to block any existing transesterification catalysts by using phosphorus compounds in a manner known per se. Phosphorus compounds suited for this are, for example, di(polyoxyethylene)hydroxymethyl phosphonate, tetraisopropylmethylene diphosphonate, and $H_3PO_4$, whereby an added P concentration of 30–50 ppm is sufficient.

The fiber and film-forming thermoplastic polyesters produced with the polycondensation catalysts of the invention, in particular polyethylene terephthalate and polybutylene terephthalate, can, of course, also be processed for example by injection molding or extrusion to form all kinds of shaped objects and profiles. If, for example, a polyethylene terephthalate produced with the polycondensation catalysts of the invention is processed into PET bottles, the latter exhibit increased transparency.

The additional polyester forming components for fiber and film-forming copolyesters can be an aliphatic diol such as ethylene glycol, propylene glycol, tetramethylene glycol, pentamethylene glycol, hexamethylene glycol, polyethylene glycol, polypropylene glycol, or poly(tetrahydrofuran) diol; an aromatic diol such as pyrocatechol, resorcinol, or hydroquinone; an alicyclic diol such as 1,4-cyclohexanedimethanol or cyclohexane diol; an aliphatic dicarboxylic acid such as adipic acid, sebacic acid, or decane dicarboxylic acid; an aromatic dicarboxylic acid such as isophthalic acid, 5-sodiumsulfoisophthalic acid, sodiumsulfoterephthalic acid, or 2,6-naphthalene dicarboxylic acid; or an alicyclic dicarboxylic acid such as hexahydroterephthalic acid or 1,3-cyclohexane dicarboxylic acid. The analogous polyester forming components for forming polyester blends can also be considered for the filament forming homopolyesters, in part aforementioned, that do not belong to the category of polyalkylene terephthalates.

Of course, the film and fiber-forming polyesters can as conventional modification agents also contain known branching agents such as pentaerythritol, trimellitic acid, pyromellitic acid, or trimesic acid or their esters, in the conventionally small amounts such as 1 to 15 microequivalents per g of polymer, which ensure not only fast spinning of 3000 to 4000 m/min and more but also draw texturing at a speed of at least 1000 m/min. These branching agents are advantageously added as a solution in ethylene glycol to the bisglycol ester of the dicarboxylic acid(s) to undergo polycondensation.

The term copolyester also includes the extensive class of polyether esters. The thermoplastic polyether esters are known to be block copolymers that are synthesized from mutually incompatible rigid crystalline and soft amorphous segments. The rigid, short-chain segments generally consist primarily of an aromatic polyester such as units of ethylene terephthalate or butylene terephthalate, while the soft, long-chain segments consist in particular of the reaction product of an aliphatic polyether, such as poly(butylene glycol) or poly(ethylene glycol), with an aliphatic, cycloaliphatic, or aromatic dicarboxylic acid. Both the long- and short-chain ester units are often copolyesters that result from the limited co-use of one or more additional dicarboxylic acid and glycol components. Thermoplastic polyether esters, for whose production the coprecipitates used as polycondensation catalysts in accordance with the invention are also suited, are described in U.S. Pat. No. 3,023,192, GB-PS 682 866, DE-PS 23 52 584, EP-A-0 051 220, and EP-A-0 109 123, for example.

The coprecipitates used in accordance with the invention are also suited for producing fully aromatic or liquid-crystalline polyesters, if this production is based on conventional polycondensation catalysts such as $Sb_2O_3$ or titanium alkoxides. For example, according to U.S. Pat. No. 4,421, 908, fully aromatic polyesters are known that consist of 10–90 mole percent of a hydroxynaphthalene carboxylic acid, 5–45 mole percent of at least one additional aromatic dicarboxylic acid such as terephthalic acid, and 5–45 mole percent of at least one aromatic diol such as hydroquinone. According to EP-A-0 472 366, fully aromatic polyesters are produced from (A) isophthalic acid, (B) hydroquinone, (C) 4,4-dihydroxydiphenyl and/or p-hydroxybenzoic acid and/or 2-hydroxy-6-naphthalene carboxylic acid, and (D) a phenol. And in EP-A-0 496 404, fully aromatic polyesters are described that are obtained by converting at least one dialkyl ester of an aromatic dicarboxylic acid, e.g., DMT, with at least one aromatic polycarbonate such as poly(4,4'-isopropylidenediphenylene carbonate) and/or an aromatic dialkyl dicarbonate. In these processes for producing fully aromatic polyesters, which are cited as examples, the polycondensation catalysts used therein, such as $Sb_2O_3$, titanium alkoxides, and zirconium alkoxides, can advantageously be replaced by the specific coprecipitates in accordance with the invention, regardless of whether they are added in the first reaction stage or in the actual polycondensation stage that follows it.

The invention will be described in more detail on the basis of the following examples. The relative solution viscosity given therein was measured at 25° C. as a 1% by weight solution in meta-cresol. The number of carboxyl groups was given as carboxyl group equivalents/$10^6$ g or mmol/kg of the polymer. This value was determined by titration of the polymer in ortho-cresol with potassium hydroxide.

The characterization of the color of the polyesters was based on the L a* b* color system. This is one of the color systems for uniform color measurement and was recommended in 1976 by the CIE (Commission Internationale de l'Eclairage) for its higher accuracy in representing perceptible colors and color differences. In this system, L is the luminance factor and a* and b* are color measurement quantities. In the present case, the b* value is important, which indicates the yellow/blue balance. A positive b* value means a discoloration toward yellow, while a negative b* value means a discoloration toward blue. Polyesters conventionally produced using antimony trioxide exhibit a b* value between 3 and 8 if no coloring agents (such as cobalt salts) are added. For products whose color is not critical, higher values are also acceptable.

EXAMPLES 1–13

Production of Catalytically Active Coprecipitates

In Table 1, the titanium and metallic compounds are summarized that are used for producing the catalytically active coprecipitates in accordance with examples 1–13.

Titanium(IV) tetraisopropylate (0.18 mol) and the corresponding metallic compound (0.02 mol) are dissolved in 100 ml pure ethanol (solution A). 10.27 g distilled $H_2O$ (0.57 mol) mixed with 100 ml pure ethanol (solution B). Solution A is placed in a container and solution B added dropwise within 30 minutes at 22° C. A white precipitate results. After stirring for 1 h, the mixture is centrifuged and the residue washed three times with distilled $H_2O$. The resulting coprecipitates are dried in a vacuum at 70° C.

TABLE 1

Titanium and metallic compounds for producing catalytically active coprecipitates in accordance with examples 1–13 with a molar ratio of the titanium compound to the metallic compound of 90:10 mol/mol.

| Example | Titanium compound | Metallic compound |
|---|---|---|
| 1 | Titanium(IV) tetraisopropylate | Aluminum(III) triethylate |
| 2 | Titanium(IV) tetraisopropylate | Magnesium(II) diethylate |
| 3 | Titanium(IV) tetraisopropylate | Potassium(I) methylate |
| 4 | Titanium(IV) tetraisopropylate | Germanium(IV) tetraethylate |
| 5 | Titanium(IV) tetraisopropylate | Sodium(I) methylate |
| 6 | Titanium(IV) tetraisopropylate | Aluminum(III) triisopropylate |
| 7 | Titanium(IV) tetraisopropylate | Iron(III) triacetate |
| 8 | Titanium(IV) tetraisopropylate | Cobalt(II) diacetate |
| 9 | Titanium(IV) tetraisopropylate | Copper(II) diacetate |
| 10 | Titanium(IV) tetraisopropylate | Zinc(II) diacetate |
| 11 | Titanium(IV) tetraisopropylate | Calcium(II) diacetate |

TABLE 1-continued

Titanium and metallic compounds for producing catalytically active coprecipitates in accordance with examples 1–13 with a molar ratio of the titanium compound to the metallic compound of 90:10 mol/mol.

| Example | Titanium compound | Metallic compound |
|---|---|---|
| 12 | Titanium(IV) tetraisopropylate | Tin(IV) tetrabutyl |
| 13 | Titanium(IV) tetraisopropylate | Tin(IV) dioxalate |

EXAMPLES 14–26 AND COMPARATIVE EXAMPLE 1

Polyethylene terephthalate was produced in a two-stage process. In the first stage, transesterification, the conversion of ethylene glycol and dimethyl terephthalate (DMT) took place in a molar ratio of 2.5:1 in the presence of 100 ppm $ZnAc_2$. 2 $H_2O$ (Ac=acetate) and 150 ppm $MnAc_2$. 4 $H_2O$, with respect to DMT, at temperatures from 175 to 250° C., whereby the continuous temperature increase from 175 to 250° C. was not conducted too rapidly in order to avoid sublimation of the DMT. In addition to the transesterification catalysts, 10 ppm M10 defoaming agent, with respect to DMT, was added. The methanol released in transesterification was distilled off via a column. When the reaction temperature of 240° C. was reached, 50 ppm phosphorus, with respect to the DMT used, was added as phosphonoacetic acid ethylester to block the transesterification catalysts.

As soon as the reaction temperature of 250° C. was attained, 100 ppm, with respect to the bis-(2-hydroxyethyl) terephthalate present, of one of the coprecipitates prepared in accordance with examples 1–12, was added in examples 14–25 in the form of a 10% by weight suspension in glycol. In example 26, only 50 ppm, with respect to the bis-(2-hydroxyethyl) terephthalate present, of the coprecipitate prepared in accordance with example 13 was used. The polycondensation reaction was conducted at 290° C. under a vacuum of 1.3 mbar.

Table 2 summarizes the added catalyst amounts, polycondensation times, relative solution viscosities, and b* values attained with the coprecipitates prepared in accordance with examples 1–13, and the results obtained with $Sb_2O_3$ in comparative example 1. The comparison of the polycondensation times of the coprecipitate catalysts of the invention with those of $Sb_2O_3$ shows that the coprecipitate catalysts of the invention cause significantly reduced polycondensation time, although their amounts are 4 or even 8 times smaller (compare examples 14–25 and example 26 with comparative example 1).

TABLE 2

Catalyst amounts, polycondensation times, relative solution viscosities, and b* values of coprecipitate catalysts prepared in examples 1–13 in comparison with $Sb_2O_3$.

| Example | Coprecipitate catalyst prepared from Ti(IV) tetraisopropylate and | Amount (ppm) | Polycondensation time (min) | Relative solution viscosity | b* |
|---|---|---|---|---|---|
| 14 | Al(III) triethylate | 100 | 90 | 1.664 | +17.77 |
| 15 | Mg(II) diethylate | 100 | 100 | 1.671 | +20.58 |
| 16 | K(I) methylate | 100 | 112 | 1.652 | +21.95 |
| 17 | Ge(IV) tetraethylate | 100 | 97 | 1.639 | +18.81 |

TABLE 2-continued

Catalyst amounts, polycondensation times, relative solution viscosities, and b* values of coprecipitate catalysts prepared in examples 1–13 in comparison with $Sb_2O_3$.

| Example | Coprecipitate catalyst prepared from Ti(IV) tetraisopropylate and | Amount (ppm) | Polycondensation time (min) | Relative solution viscosity | b* |
|---|---|---|---|---|---|
| 18 | Na(I) methylate | 100 | 95 | 1.645 | +18.66 |
| 19 | Al(III) triisopropylate | 100 | 112 | 1.652 | +14.03 |
| 20 | Fe(III) triacetate | 100 | 113 | 1.661 | +15.66 |
| 21 | Co(II) diacetate | 100 | 98 | 1.643 | +17.25 |
| 22 | Cu(II) diacetate | 100 | 76 | 1.646 | +12.39 |
| 23 | Zn(II) diacetate | 100 | 95 | 1.667 | +13.48 |
| 24 | Ca(II) diacetate | 100 | 129 | 1.661 | +19.40 |
| 25 | Sn(IV) tetrabutyl | 100 | 96 | | +19.20 |
| 26 | Sn(IV) dioxalate | 50 | 98 | 1.635 | +6.95 |
| Comp. Ex. 1 | $Sb_2O_3$ | 400 | 140 | 1.630 | +3.80 |

COMPARATIVE EXAMPLE 2

Preparation of a Malonate Resin with Dibutyl Tin Oxide as a Catalyst

As an apparatus for this example, a 2000 ml five-neck flask was used that was equipped with a metal stirrer, dropping funnel, nitrogen feed tube, thermosensor for the interior temperature, a 300 mm long Vigreux silver coated column, and a distillation column head. The initial reaction mixture comprised the following components:

312.45 g (3 mol) 1,5-pentane diol as component A, 560.60 g (3.5 mol) diethyl malonate as component B, 0.87 g (=0.1% by weight, with respect to A+B) dibutyl tin oxide as component C, 43.5 g (15% by weight with respect to A+B) meta-xylene as component D, 130.5 g (15% by weight, with respect to A+B) meta-xylene as component E.

As a catalyst, the dibutyl tin oxide common for this reaction was used. The components A, B, C, and D were weighed into the flask and flushed with nitrogen. The mixture was then heated slowly and the first drops of ethanol were distilled off at an interior temperature of 115° C. At a declining distillation rate, the interior temperature was increased to 200° C. Component E was then added dropwise as a carrier for the distillation, and removal of the ethanol/meta-xylene distillate continued. When the turnover reached 99.5%, the polycondensation was terminated. This turnover had been attained after 16 hours.

The total quantity of distillate at this time was 378.03 g. The quantity of ethanol distilled off was 274.92 g (theoretical total ethanol=276.42 g). The Gardner color index was 13.

EXAMPLE 27

Preparation of a Malonate Resin with a Coprecipitate Catalyst of the Invention in Accordance with Example 13

The experiment of comparative example 2 was repeated with the coprecipitate catalyst prepared from Ti(IV) tetraisopropylate and tin(IV) dioxalate in accordance with example 13. The initial reaction mixture comprised the following components:

312.45 g (3 mol) 1,5-pentane diol as component A, 560.60 g (3.5 mol) diethyl malonate as component B, 0.87 g (0.1% by weight with respect to A+B) coprecipitate catalyst according to example 13 as component C, 43.5 g (5% by weight with respect to A+B) meta-xylene as component D, 87.0 g (10% by weight with respect to A+B) meta-xylene as component E.

The components A, B, C, and D were weighed into the flask and flushed with nitrogen. The mixture was then heated slowly and the first drops of ethanol mixed with metaxylene were distilled off at an interior temperature of 142° C. At a declining distillation rate, the interior temperature was increased to 200° C. The component E was then added dropwise as a carrier for the distillation, and removal of the ethanol/meta-xylene distillate continued. When the turnover reached 99.6%, the polycondensation was discontinued. This turnover had been attained after only 7 hours.

The total quantity of distillate at this time was 342.28 g. The quantity of ethanol distilled off was 276.04 g (theoretical total ethanol=276.42 g). The Gardner color index was 10.

COMPARATIVE EXAMPLES 3a AND 3b WITH COMMERCIALLY AVAILABLE TITANIUM DIOXIDES a) Analogous to examples 14–26, preparation of a polyethylene terephthalate was attempted, whereby commercially available titanium dioxides were to function as polycondensation catalysts. For this purpose, after the transesterification conducted as in examples 14–26, and after blocking the transesterification catalysts when attaining the reaction temperature of 250° C., 500 ppm Hombitec KO 3 $TiO_2$ (a titanium dioxide produced by Sachtleben), with respect to the bis-(2-hydroxyethyl) terephthalate present, was added to the reaction mixture in the form of a 10% by weight suspension in glycol as a polycondensation catalyst. The polycondensation reaction took place at 290° C. under a vacuum of 1.3 mbar. After 180 minutes reaction time, the experiment was discontinued, since the melt viscosity, and thus the relative viscosity, was insufficient, due to the excessively low molecular weight of the polycondensation product.

b) A second experiment conducted under the same reaction conditions also failed with the same results, wherein 500 ppm Tilcom HPT 3 $TiO_2$ (a titanium dioxide produced by Tioxide), with respect to the bis-(2-hydroxyethyl) terephthalate present, was added as a polycondensation catalyst in the form of a 10% by weight suspension in glycol.

COMPARATIVE EXAMPLE 4

In a polycondensation conducted as in examples 14–26, 213 ppm titanium tetrabutylate, with respect to the bis-(2-hydroxyethyl) terephthalate present, was added as a polycondensation catalyst at 250° C. in the form of a 5% by weight solution in glycol. The polycondensation reaction took place at 290° C. under a vacuum of 3.5 mbar. After a reaction time of 134 minutes, a polymer was obtained with a relative solution viscosity of 1.633. The b* value was 15.5, the COOH end-group content 20.2 equivalents/$10^6$ g polymer. This comparative example shows in particular that while titanium tetrabutylate, with a significantly inferior b* value, has a higher catalytic activity than $Sb_2O_3$, it must nevertheless be used in a higher concentration than the catalysts of the invention to attain comparably short polycondensation times.

What is claimed is:

1. Process for producing polyesters and copolyesters via polycondensation of polyester-forming starting components, comprising producing esters or oligoesters in a first reaction stage and polycondensing the esters or oligoesters in the presence of a polycondensation catalyst in a second reaction stage, wherein the polycondensation catalyst comprises one or more titanium-containing coprecipitates, the coprecipitates being prepared by simultaneous hydrolytic precipitation of a titanium compound and a metallic compound of a metal selected from the groups IA, IIA, VIIIA, IB, IIB, IIIB, and IVB, and wherein the titanium compound and the metallic compound are, independently of one another, an alkylate, alcoholate, or carboxylate of titanium or the metal, respectively, and the molar ratio of the titanium compound to the metallic compound is $\geq 50:50$ mol/mol.

2. Process in accordance with claim 1, wherein the metal of the metallic compound is sodium, potassium, magnesium, calcium, iron, cobalt, copper, zinc, aluminum, germanium, or tin.

3. Process in accordance with claim 1, wherein the molar ratio of the titanium compound to the metallic compound is $\geq 80:20$ mol/mol.

4. Process in accordance with claim 1, wherein the alkylate, alcoholate, or carboxylate group of titanium or the metal, respectively, is a compound with 1–6 C atoms.

5. Process in accordance with claim 1, wherein the alkylate group is a butyl group, the alcoholate group is a methylate, ethylate, or i-propylate group, and the carboxylate group is an acetate or oxalate group.

6. Process in accordance with claim 1, wherein the coprecipitate is produced from titanium(IV) tetraisopropylate and tin(IV) dioxalate in a molar ratio of 90:10 mol/mol.

7. Process in accordance with claim 1, wherein the coprecipitate has a water content of 0 to 15% by weight with respect to hydrated coprecipitate.

8. Process in accordance with claim 1, wherein the coprecipitate is present in a total amount of 5 to 500 ppm with respect to the esters or oligoesters to undergo polycondensation.

9. Process in accordance with claim 8, wherein the coprecipitate is present in a total amount of 10 to 100 ppm with respect to the esters or oligoesters to undergo polycondensation.

10. Process in accordance with claim 1, wherein the coprecipitate is added to the esters or oligoesters to undergo polycondensation before the polycondensing in the form of a 5 to 20% by weight glycolic suspension.

11. Process in accordance with claim 1, wherein any transesterification catalysts present from the first reaction stage are blocked by adding one or more phosphorus compounds after completion of the first reaction stage.

12. Process in accordance with claim 11, wherein the blocking agent is carbethoxymethyldiethyl phosphonate, di(polyoxyethylene)hydroxymethyl phosphonate, tetraisopropylmethylene diphosphonate, or $H_3PO_4$.

13. Process in accordance with claim 1, wherein the polyesters and copolyesters comprise alkyd resins with a relative molecular weight of <10,000.

14. Process in accordance with claim 1, wherein the polyesters and copolyesters comprise saturated polyester resins with a relative molecular weight of <10,000.

15. Process in accordance with claim 1, wherein the polyesters and copolyesters comprise polyesters and copolyesters that are precursors for polyurethanes with a relative molecular weight of <10,000.

16. Process in accordance with claim 1, wherein the polyesters and copolyesters comprise thermoplastic polyesters and copolyesters with a relative molecular weight of >10,000.

17. Process in accordance with claim 16, wherein the thermoplastic polyesters and copolyesters comprise polyethylene terephthalate, polybutylene terephthalate, poly(ethylene-2,6-naphthalenedicarboxylate), poly(butylene-2,6-naphthalenedicarboxylate), poly(1,4-dimethylenecyclohexane terephthalate), or their polyester blends on the basis of high homopolyester fractions of at least 80 mole percent.

18. Process in accordance with claim 16, wherein the thermoplastic polyesters and copolyesters comprise polyether esters.

19. Process in accordance with claim 1, wherein the polyesters and copolyesters comprise fully aromatic or liquid-crystalline polyesters.

* * * * *